United States Patent

Sloan et al.

[11] 4,101,067
[45] Jul. 18, 1978

[54] HEAT SINK WELDING AND PURGING APPARATUS

[75] Inventors: Marlo S. Sloan; Arthur B. Renfro, Jr., both of Bakersfield, Calif.

[73] Assignee: Sloan Purge Products Co., Inc., Bakersfield, Calif.

[21] Appl. No.: 708,224

[22] Filed: Jul. 23, 1976

[51] Int. Cl.² .............................................. B23K 35/00
[52] U.S. Cl. ...................................... 228/222; 228/46
[58] Field of Search .................... 228/42, 46, 219, 222

[56] References Cited

U.S. PATENT DOCUMENTS

| 2,254,314 | 9/1941 | Reed | 228/46 |
| 3,597,833 | 8/1971 | Frederick et al. | 228/219 |

FOREIGN PATENT DOCUMENTS

| 1,404,467 | 8/1975 | United Kingdom | 228/219 |

Primary Examiner—Robert C. Watson
Attorney, Agent, or Firm—Clarence A. O'Brien; Harvey B. Jacobson

[57] ABSTRACT

A heat sink welding and purging apparatus for use in the welding of pipe joints for piping to be used with nuclear power systems and the like wherein the weld area must be kept below a temperature at which the dangers of carbide precipitation occur. The various embodiments include expandable heat sink and sealing bladders which are expanded in use to respectively seal the adjacent interiors of the ends of the two pipes to be welded at the adjacent joints. After expanding and sealing the pipe openings, coolant is fed into the interior of the apparatus to cool the joint being welded. Also purging gases may be used to eliminate undesirable atmospheric gases adjacent the weld joint.

22 Claims, 10 Drawing Figures

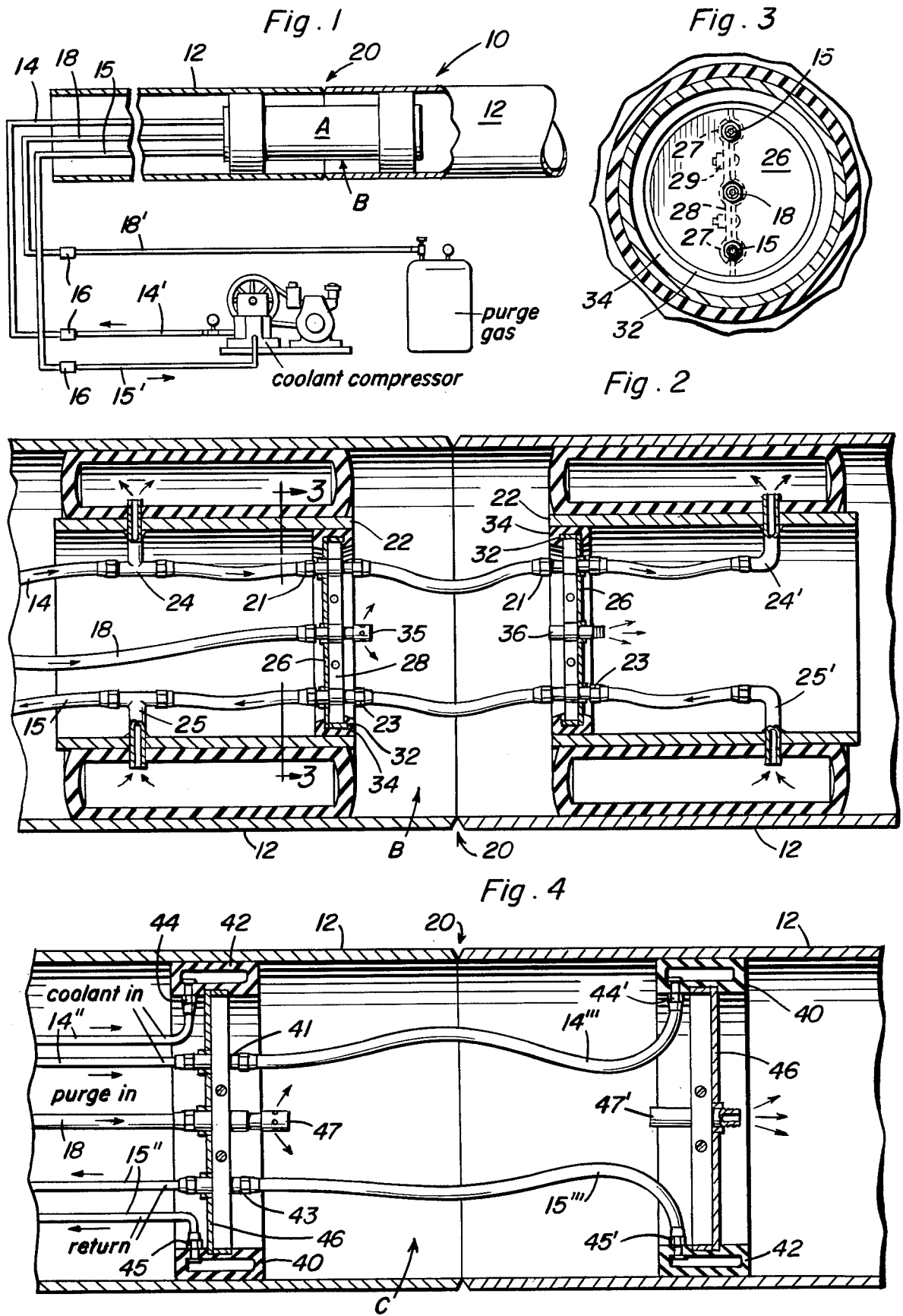

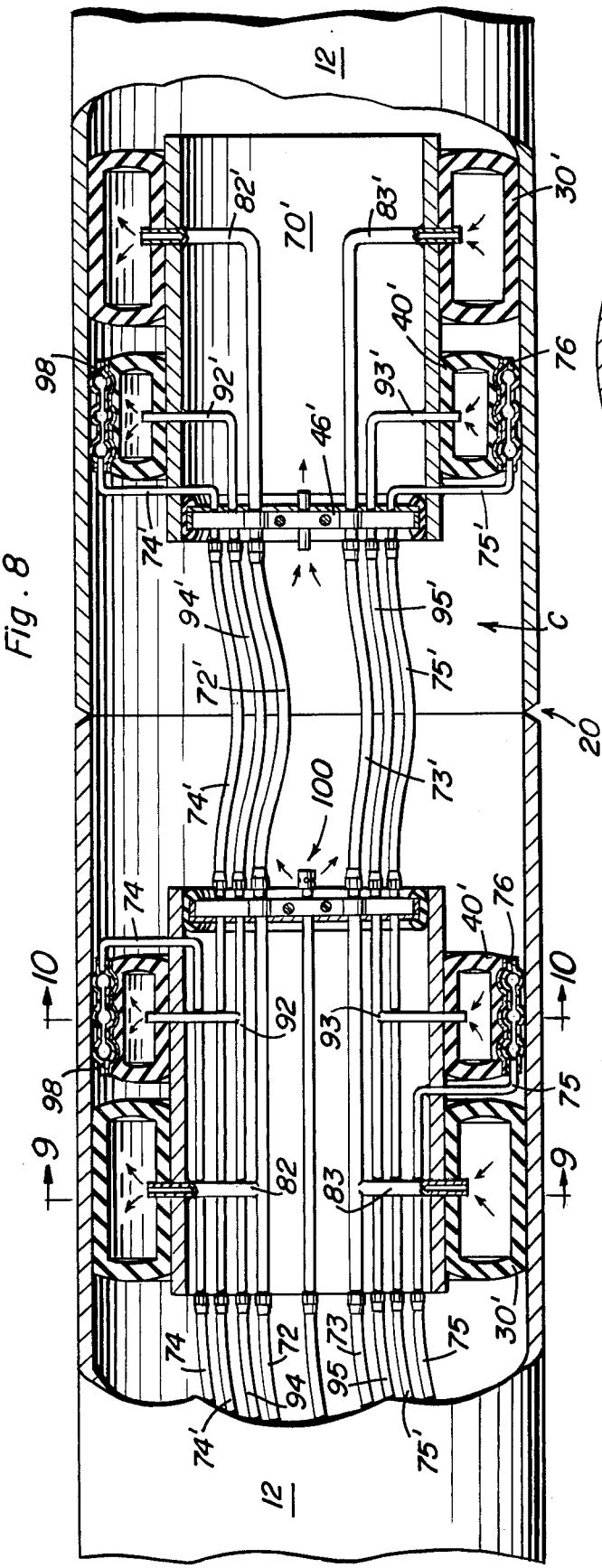
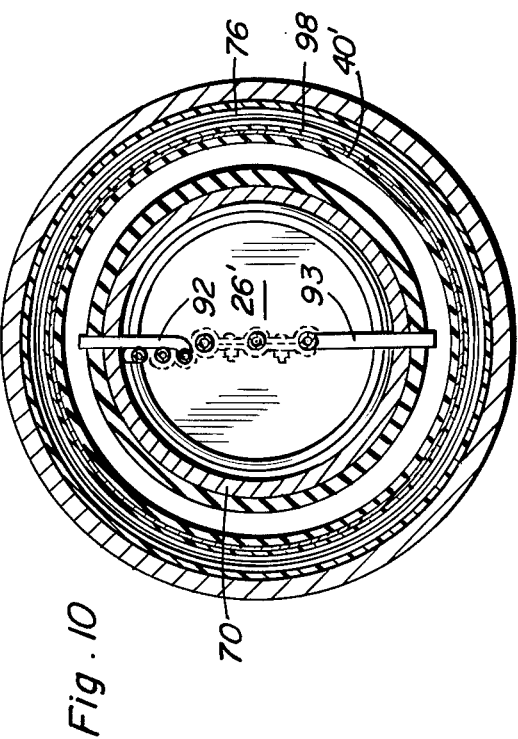

HEAT SINK WELDING AND PURGING APPARATUS

BACKGROUND OF THE INVENTION

1. Field of the Invention

This invention relates generally to apparatus for use with the welding of piping to be used in nuclear power plants and systems. It relates specifically to the apparatus used for heat sinking and purging of the piping.

2. Description of the Prior Art

A common problem with known devices used in the welding of pipes is that they do not offer the flexibility of both cooling as a heat sink together with purging features. Known type devices merely provide heat sink or cooling functions, or purging functions, but not the combination of same.

Another problem with known type devices are that they are not readily adaptable for large scale operations or mass welding of numerous piping. That is, they are so complex and involved that much time is spent in setting them up and they are not easily transferable from one set of pipes to be welded to another set.

Another problem with known type devices is that they are not readily adaptable for use with either gas type purging functions and/or liquid-type purging and cooling functions.

Known prior art patents which may be pertinent to this invention are as follows:

U.S. Pat. No. 2,470,744 — May 17, 1949
U.S. Pat. No. 2,819,517 — Jan. 14, 1958
U.S. Pat. No. 3,194,466 — July 13, 1965
U.S. Pat. No. 3,431,945 — Match 11, 1969
U.S. Pat. No. 3,779,068 — Dec. 18, 1973
U.S. Pat. No. 3,902,528 — Sept. 2, 1975

None of these known prior art devices offers the new and unique features of the invention disclosed herein.

SUMMARY OF THE INVENTION

An object of the present invention is to provide a combination heat sink and purging apparatus for use with pipe joint welding of piping to be used with nuclear systems.

Another object of the present invention is to provide apparatus which offers the flexibility of either purging an area adjacent a joint between two pipes to be welded as well as providing heat sink or cooling functions to said area.

A further object of this invention is to provide apparatus which will be easily and quickly installable in the respective open ends of pipes to be joined by appropriate welding. It is important that said weld, in the case of piping to be used with nuclear systems, be held below a given temperature in order to prevent the dangers of carbide precipitation. This is effected by the apparatus of this invention through the heat sink and cooling function thereof.

A still further object of this invention is to provide expandable bladder structure which will seal the adjacent ends of piping to be joined and welded, and also will permit the addition of either cooling fluid therethrough for heat sink purposes as well as fluid for purging purposes.

The various embodiments disclosed herein of this invention teach a number of ways of sealing the open ends of piping which are to be jointed together by appropriate welding. The embodiments all have the common feature of sealing the internal ends of said piping and all also have the feature of permitting cooling fluid to be forced in and allowed out of said apparatus. In addition structure is provided for applying purging gas or fluid to the area adjacent the joint being welded for displacing any undesired air or other gas therefrom. Also, after the initial root weld is made, coolant may be fed into the joint area for additional cooling thereof.

The device of this invention has the advantage of being usable as a purging unit, a heat sink unit, or combination of the two. When using the devices of the purge unit, inert gas or air is used to inflate the bladder structure. Bleed means associated with the bladder structure permit the inflated bladders to be deflated in order to facilitate their removal from the pipe after the welding of the pipe joint.

When the apparatus is being used for heat sinking and purging in combination, there are many factors to be considered such as: the pipe schedules, the different configuration of the pipes, the weld deposit, and the heat sink temperature desired. Because of these factors, the cooling liquid used may vary from chilled water to water-glycol mix to cryogenics such as freon or $LN_2$.

Normally, the apparatus of this invention will be used with pumping units offering full flow capability and appropriate controls therefor which are capable of variable pressure ranges. One embodiment of the device shows the use of pre-shaped coils or blocks which are expanded into engagement with the pipe interiors by means of the expandable bladder units. When a cryogenic coolant is being used a high quality insulating pad normally will be placed between these coils or blocks and the bladder in order to absorb some of the initial cold shock to the bladders.

Another feature of this invention is that all of the gas and liquid lines are equipped with quick disconnect fittings in order to simplyfy the quick transfer of the pumping and purging apparatus from one apparatus and pipe set-up to another. This permits the quick and rapid welding of pipe joints on an assembly line or mass production type basis. This is very important for usable application on a commercial basis.

Another very important feature is in the fact that with this combination apparatus the use of purging gas therewith will have no effect upon the cooling and heat sinking process, that is, the proper cooling of the weld and adjacent area will take place irrespective of whether or not the system is purged by use of a purging gas. Also, if additional cooling of the weld area is desired, the use of purge gas may be completely omitted and additional coolant substituted therefor.

The range of cooling for this apparatus and for the nuclear piping to be joined by welding is in the minus 50 degree F. range and the expandable bladders of this apparatus are made of silicone rubber which has the characteristics and capabilities of operating very satisfactorily within this temperature range.

These, together with other objects and advantages which will become subsequently apparent, reside in the details of construction and operation as more fully hereinaftrer described and claimed, reference being had to the accompanying drawings forming a part hereof, wherein like numerals refer to like parts throughout.

BRIEF DESCRIPTION OF THE DRAWINGS

FIG. 1 is a perspective view of the basic system for use with the various embodiments of this invention.

FIG. 2 is a side elevational view, partly in cross section, of the first embodiment of this invention.

FIG. 3 is an end view, partly in cross section, taken generally along line 3—3 of FIG. 2.

FIG. 4 is a side elevational view, partly in cross section, of a second embodiment of this invention.

FIG. 8 is a side elevational view, partly in cross section, of a fourth embodiment of this invention.

FIG. 9 is an end view, partly in cross section, taken generally along line 9—9 of FIG. 8.

FIG. 10 is an end view, partly in cross section, taken generally along line 10—10 of FIG. 8.

DESCRIPTION OF THE PREFERRED EMBODIMENT

Figure 7:
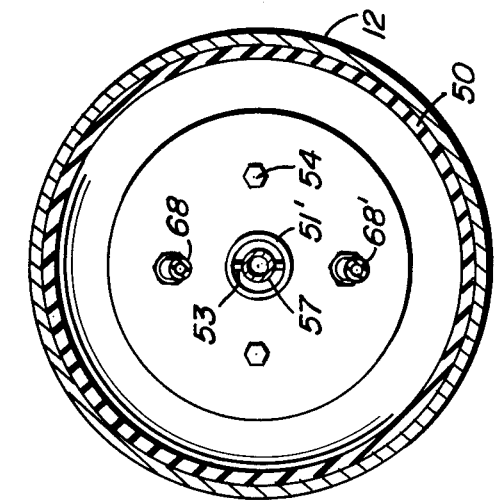
FIG. 7 is an end view, partly in cross section, taken generally along line 7—7 of FIG. 6.

FIG. 1 of the drawings, indicates by reference numeral 10, the basic heat sink and purging apparatus of this invention as installed at the joining point 20 of the two ends of pipe 12 for the purpose of welding same. Letter A indicates the basic apparatus and the gas and liquid lines are shown as extending to the left of the purging apparatus through the exit pipe 12. The line 14 is for the input of coolant from an appropriate coolant compressor as shown, connected by a coolant line 30 thereof 14' and a quick connect/disconnect coupling 16. Similarly, a coolant return line 15 is provided which is connected to the coolant compressor by return line 15' and another quick connector 16. A purging gas unit is also shown connected to purging line 18 through quick connect/disconnect member 16 and purge line 18'. Quick connect/disconnect fittings 16 are provided at the ends of lines 14', 15' and 18' so that the cooling compressor unit and the purge gas unit may be used with a large number of heat sink and purge apparatus for a series of pipe joints to be welded. Thus saving the cost of multiple compressor and gas units, and also greatly increasing the efficiency and mass production capabilities of the overall combination.

Looking at FIGS. 2 and 3 which show a first embodiment of this invention, the apparatus will now be described in detail. Main tubular support members 22 are provided which are mounted in the central interior of the pipes 12 and straddling the joint to be welded with disc support members 26 having clamping brackets 28 with line engaging portions 27 provided thereon Appropriate conventional nuts and bolts 29 are used to secure the clamps to the bracket members. A circumferential ring 32 is appropoirately fastened to the bracket member 26 and provided with a resilient mounting hub 34. The purpose of these bracket members are to support and retain the input and output coolant lines and the purging line. As described above, the input coolant line 14 which in the drawings is from the left connects to an input T24 which is a tee coupling. The input line then connects with feed through couplings 21 in each of the support brackets and then connects with an ell angle input feed 24' on the far right of the Figure. Resilient, expandable bladder members 30 of silicone rubber or the like are provided about the outer circumference of the main tubular members 22. When the input coolant is applied to input line 14 and through the T member 24 and L coupling 24' to the interior of said bladders, the coolant which is under pressure will expand the bladders 30 into firm, positive engagement with the inner portion of the respective pipes 12. Thus expanded, these bladders will form airtight seals between the joint to be welded and the rest of the interior of the pipe. Also, the coolant will function as a heat sink to absorb the excess heat from the weld as it is being made.

The return coolant arrangement is shown along the bottom portion of FIG. 2 and consists of the return coolant line 15, connected to an appropriate tee member 25 and an L member 25' through the feed through coupling members 23 in the supports 26. With this arrangement of coolant input and output, a continuous flow of coolant may be provided, which also may be varied as to rate in order to determine and control the amount of heat sink effect at the ends of pipes 12 and the joint therebetween 20. In some cases, after a root pass is made at the weld joint, that is, the first initial welding step which seals the contact between the pipe ends so that the joint then becomes air and gas tight, coolant may be introduced into the area between the bladders 30 and the joint. This will provide additional direct cooling of the joint.

However, in most cases a purging gas will be added to this area by means of the purging input line 18 which connects to a coupling 35 on the left support 26 and in turn is exhausted by another coupling 36 in order to add and exhaust purge gas such as Argon into said interior. It generally is not necessary to have a return line for the purging gas because its primary effect is to purge or displace any air or combustible fluid within the interior area B while the welding is being done. Obviously, when the heat sink bladders 30 are collapsed, the purging gas will be completely exhausted.

Looking now at FIG. 4 of the drawings, the second embodiment of this invention will be described. This may basically be similar to that described for the internal structure within members 22 of the first embodiment. This second embodiment basically consists of two solid discs 46 having mounted about the outer circumference thereof inflatable bladders 40 which when inflated contact with the internal circumference of the pipes 12 along contact area 42. Again, input coolant lines are indicated at 14" feeding to input couplings 44 and 44' in the respective heat sink and bladder members 40 with the left disc 46 being provided with an appropriate feed through 41 for the line 14'" which connects to the input 44". Coolant return lines are indicated by 15" which are also appropriately connected to an outlet coupling 45, and a feed through 43, line 15'" and another outlet coupling 45'. A purge input is indicated at 18 which connects to a central feed through member 47 for the purpose of applying purge gas to the interior C as indicated. As can be seen, a right side feed through member 47'0 is provided for exhausting the purge gas.

In the operation of this second embodiment, the two inflatable heat sink and bladder units will be appropriately inserted into the ends of pipes 12, close to the joint 20 to be welded, and then the coolant couplings will be coupled to the coolant compressor and the bladders inflated to form an airtight seal within the pipe ends. The rate of coolant flow may be adjusted for the desired amount and rate of heat sink effect. Purging gas may then be added or, as mentioned above, additional coolant through the input line 18 may be added after the first weld pass is made.

Figure 5:
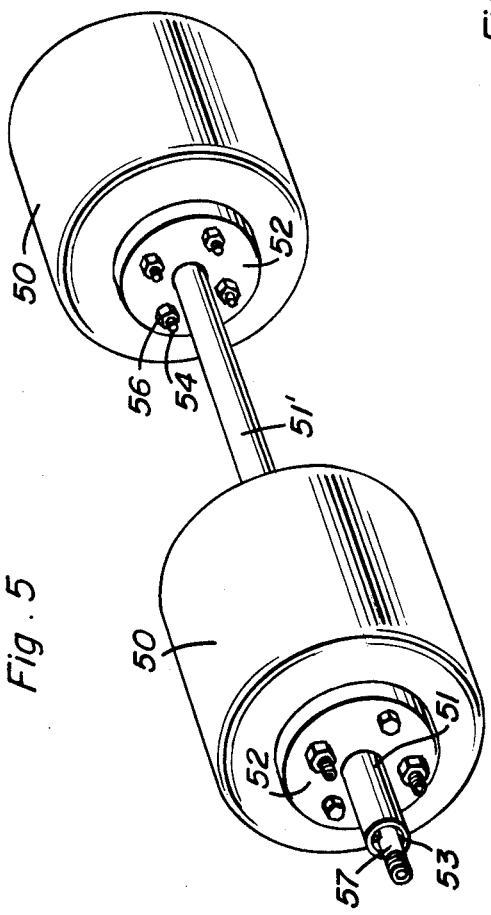
FIG. 5 is a perspective view of a third embodiment of this invention.
Figure 6:
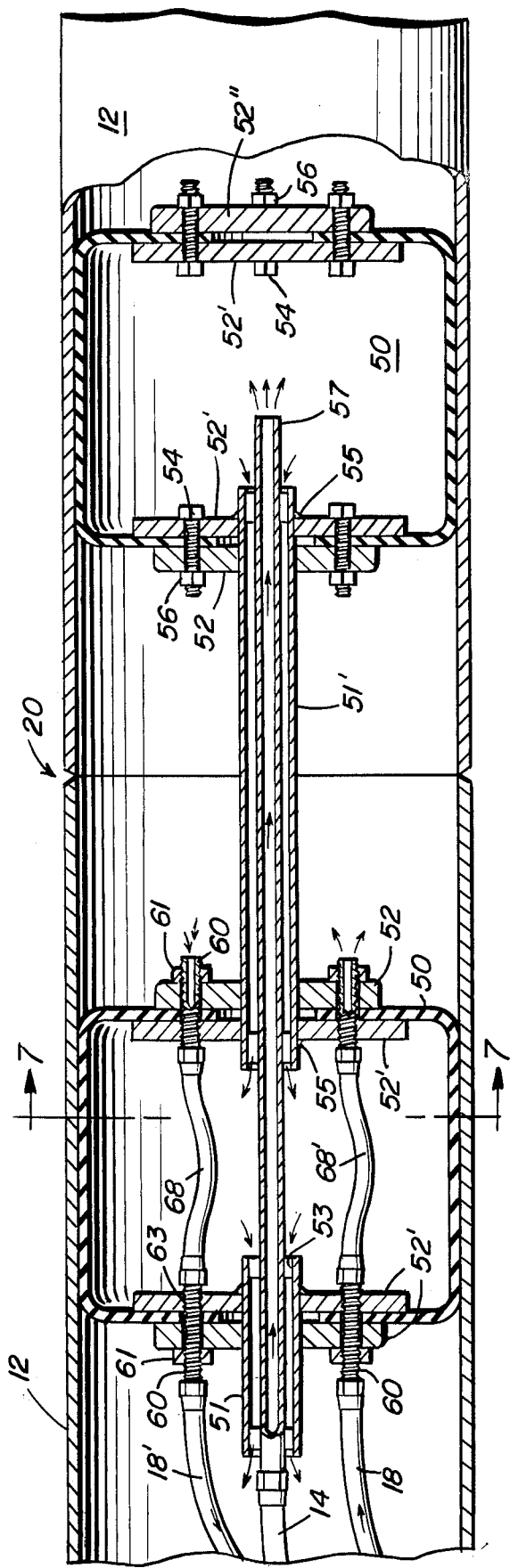
FIG. 6 is a side elevational view, partly in cross section, of the third embodiment.

FIGS. 5, 6 and 7 show a third embodiment of this invention. This apparatus comprises two inflatable bladder members 50 of silicone rubber or the like, mounted and supported by tubes 50 and 51', which are in turn supported from a central pipe 57 by means of flow through spacer elements 53. The spacer elements 53 will permit fluid to pass between the outer circumference of the pipe 57 and the inner diameter of the tubes 51 and 51', as will be described in detail below. A plurality of support plates 52 are also provided having central apertures therein which closely fit over the tubular members 51 and 51'. Complementary and slightly larger discs 52' are provided within the bladder members per se. These may be best seen in FIG. 6. Appropriate bolts 54 and nuts 56 secure the plates to the walls of the bladders 50. The plate 52", on the far right of the FIG. 6 view, is slightly different from the other plates in that no central aperture is provided therein. As can be seen in FIG. 6, appropriate welding 55 secures the inner plates 52' to the respective tubular members 51 and 51'. This is for the purpose of providing mechanical support to the bladder structures as well as to achieve the fluid tight integrity thereof.

A coolant input line 14 is connected to the screw threaded end of input pipe 57 for applying the coolant through the center of pipe 57 to the bladder on the right. While in the previous embodiments, the coolant has been set forth as being any desired type such as water, freon, or other type refrigerants etc. In this embodiment, the coolant would normally be water because no return line is provided to the coolant pump, and the coolant is simply exhausted or wasted on the surrounding ground area. After the rightmost bladder 50 is inflated by the coolant under pressure, the overflow will pass through the tubular member 51' between the bladders 50 and then into the leftmost bladder to inflate same. The overflow from this bladder, after expansion of same, will be through the tubular member 51 to waste exhaust as already mentioned. Again, the coolant flowing through both bladders will function as a heat sink for the ends of the pipes 12 and weld joint 20.

After the bladders have been inflated purging gas may also be applied by means of the purge lines 18 and 18' connected to the feed through members 60 provided in the support plates 52 and 52' of the leftmost bladder. These feed through members 60 are appropriately screw threaded on the oustide circumference thereof for engagement with center tapped apertures 63 provided in the plates 52' and secured on the outside of plates 52 by means of locking nuts 61. Connecting lines 68 and 68' are provided within the bladder to connect the respective feed through members. Thus, as can readily be visualized, when input purging fluid is applied through line 18 to the feed through coupling 60, the appropriate fluid will be conveyed into the interior between the bladders and the inside portion of the pipe joint 20. An inert gas such as Argon may be applied through the input line 18 or as already mentioned coolant may also be fed therethrough. The lower input 18 feeds the purging gas or coolant into the device while the upper line 18' is used to exhaust same.

The forth embodiment shown in FIGS. 8, 9 and 10 will now be described. This embodiment basically comprises units 70 and 70' which are actually quite similar in construction. Mounted at one end of each of these units, as shown in FIG. 8, are inflatable bladder members 30' similar to that already discussed with the embodiment of FIG. 2. These bladders 30' are connected by an inflation input line 72 to a T connection 82, and by continuing inflation line 72' to the L member 82'. Exhaust or deflation line 73 is provided which is appropriately connected to the T member 83 and further by means of deflation or exhaust line 73' to the L 83'. The inflation and deflation procedure is like that already described above. While normally these bladders would be inflated merely for positioning and blocking purposes, coolant could also be used as the inflation means and to provide additional cooling to the pipe structure.

Spaced along the members 70 and 70' and toward the other ends of said members from the bladders 30' are smaller inflatable sealing and cooling bladders 40'. These bladders are somewhat similar to the bladders 40 described in the embodiment of FIG. 4. However, mounted upon the outer surface circumferentially thereof are metal coolant coils 76 which are for the purpose of cooling and heat sinking the pipe ends at extremely low temperatures by cryogenic cooling. Cryogenic cooling functions at extremely low temperatures and the cooling coil 76 and appropriate feed and exhaust lines therefor must be resistant to this extremely low temperature and be both extremely strong and flexible at low temperatures. The input coolant line is shown at the left of FIG. 8 as 74 feeding to the fluid coil 76 of the member 70. An exhaust for this coolant is indicated by reference numeral 75. The coolant input for the right member 70' is indicated by line 74' while the exhaust therefor is indicated by the line 75'. Of course the cryogenic cooling is fed by appropriate extremely low temperature pumps, etc., not shown, similar, however, to the coolant compressor shown in FIG. 1. The input line for the inflating/coolant of the bladder 40' is indicated by reference numeral 94 connecting to a T92 and then connected by further line 94' to the L92', and the exhaust for the inflation/coolant of the bladders 40' is by L93', coupling line 95', T93 and exhaust line 95. Thus, as has already been described in the previous embodiments, appropriate inflation of the bladders 40' are effected by applying inflation/coolant to the input 94 and controlled by the rate of exhaust through the outlet 95. Since the cryogenic method of cooling is such a shock to the associated components, an appropriate insulator block or layer may be provided between the outer surface of the bladders 40' and the inner surface of the coolant coil 76 as indicated by the reference numeral 98. Discs 46' having appropriate mounting and clamping structures for the respective lines and support structure, like that for discs 46 of FIG. 4 are also provided for this embodiment as shown in the Figures. However, for the sake of clarity reference numerals have not applied to these supports and clamps since numerous variations of same may be actually utilized and practiced and are basically immaterial to the overall successful operation of the apparatus. The main requirement being that they be gas and liquid tight so that purging fluid and/or coolant may be added to space C.

While the purging input and output lines have not been shown in these Figures in complete detail, again for the sake of clarity, the lines would be fed in through one portion of the devices, such as the center thereof, as generally indicated by the reference numeral 100 in FIG. 8. Again, the purging operation and functions would be as described above for the previous embodiments.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for heat sinking and purging pipes to be welded for use in nuclear systems and the like, comprising: first means for sealing internally the adjacent ends of two abutting pipes to be welded; and, second means for directing a coolant into the first means for cooling said sealed abutting pipe ends in order to effect a heat sink function in order to keep the temperature of the weld area below that where the dangers of carbide precipitation occur.

2. The structure as set forth in claim 1, wherein the first means includes inflatable members mountable internally of each of said pipes and expandable by the coolant in order to form a tight seal internally therewith.

3. The structure as set forth in claim 2, wherein the second means includes coolant feed lines and coolant return lines associated with the inflatable members in order to cool the pipes adjacent the joint to be welded.

4. The structure as set forth in claim 3, together with third means for purging the atmosphere in the sealed portion between the inflatable members which is internally of the joint being welded.

5. The structure as set forth in claim 3, together with a coolant compressor connected to the coolant feed lines by quick connect/disconnect couplings, and purge gas source means connected to the space between the inflatable members.

6. The structure as set forth in claim 5, wherein the first means also includes central support structure for supporting the inflatable members thereon and the associated lines therefor, and also the input for the purging means.

7. A purging and cooling apparatus for use with the welding of cylindrical members, comprising: inflatable means for expandable engagement with the cylindrical members to be welded adjacent the weld joint, and means for adding inflation and coolant medium to the inflatable means for inflating the inflatable means and cooling the area near the weld joint, the inflation and coolant medium being the same fluid material.

8. The structure as set forth in claim 7, wherein the inflatable means includes at least two expandable bladder members which when inflated securely engage with the metal surface of the cylindrical members, and at least one inflation-coolant line is provided to each of the bladder members.

9. The structure as set forth in claim 8, wherein at least one exhaust-coolant line is provided to each of the bladder members.

10. The structure as set forth in claim 8, together with separate cryogenic coils provided on the bladder members for contact with the metal surface of the cylindrical members, and appropriate input and output lines connected to said coils for feeding a cryogenic medium through the coils.

11. The structure as set forth in claim 9, together with a purging fluid input means for the space between the two inflatable bladder members in order to purge the atmosphere contained between same and adjacent the weld joint.

12. The structure as set forth in claim 9, wherein the expandable bladder members are each mounted on a central tubular support member and the inflation/coolant lines run inside the central tubular member for ease of installation and operation.

13. The structure as set forth in claim 12, wherein the exhaust/coolant lines also run inside the central tubular member for protection and ease of installation in operation.

14. The structure as set forth in claim 13, wherein the means connected to the inflatable means in order to provide the inflation and coolant medium consists of quick change connect and disconnect couplings between the inflation/coolant lines and the exhaust/coolant lines in order to allow a number of multiple apparatus to be operated from the same coolant compressor.

15. The structure as set forth in claim 12, together with separate purge gas means for applying an inert gas to the area between the two inflated bladder members and the weld joint for the purpose of displacing any combustible and contaminated air contained therein.

16. The structure as set forth in claim 15, wherein the purge means includes a separate purge line run inside of the central tubular member and supported thereby, and purge gas supply means connected to the external portion of said purge line by quick connect/disconnect coupling.

17. The structure as set forth in claim 15, wherein the purge means includes a separate purge line run through one of the bladder members and opening into the weld area, and connected to a source of purge gas by quick connect/disconnect coupling members externally of the pipe end bladder member.

18. The structure as set forth in claim 9, wherein the expandable bladder members each have a central tubular support member, and the inflation/coolant lines run inside the central tubular support members for ease of installation and operation.

19. The structure as set forth in claim 18, wherein the exhaust/coolant lines also run inside the tubular support members for protection and ease of installation and operation.

20. The structure as set forth in claim 19, wherein the means connected to the inflatable means in order to provide the inflation and coolant medium consist of quick change connect and disconnect couplings between the inflation/coolant lines and the exhaust/coolant lines in order to allow a multiple number of apparatus to be operated from the same coolant compressor.

21. The structure as set forth in claim 18, together with separate purge gas means for applying an inert gas to the area between the two inflated bladder members and the well joint for the purpose of displacing any combustible and contaminated air contained therein.

22. The structure as set forth in claim 21, wherein the purge means includes a separate purge line run inside at least one of the tubular support members and supported by same, and purge gas supply means connected to the external portion of said purge line by a quick connect-/disconnect coupling.

* * * * *